(12) United States Patent
Hoshino (10) Patent No.: US 7,154,210 B2
(45) Date of Patent: Dec. 26, 2006

(54) DRIVING DEVICE

(75) Inventor: Takayuki Hoshino, Osaka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 11/008,378

(22) Filed: Dec. 9, 2004

(65) Prior Publication Data

US 2006/0055284 A1 Mar. 16, 2006

(30) Foreign Application Priority Data

Sep. 16, 2004 (JP) .............................. 2004-269475

(51) Int. Cl.
*H01L 41/09* (2006.01)
*H02N 2/02* (2006.01)

(52) U.S. Cl. ...................... 310/317; 310/328
(58) Field of Classification Search ................ 310/317, 310/318, 328
See application file for complete search history.

(56) References Cited

U.S. PATENT DOCUMENTS

| 5,001,409 A | * | 3/1991 | Hosaka et al. ............... 318/592 |
| 5,225,941 A | * | 7/1993 | Saito et al. ................... 359/824 |
| 5,554,904 A | * | 9/1996 | Terajima ................. 310/316.01 |
| 5,587,846 A | * | 12/1996 | Miyano et al. ............... 359/824 |
| 5,589,723 A | * | 12/1996 | Yoshida et al. .............. 310/328 |
| 5,675,444 A | * | 10/1997 | Ueyama et al. .............. 359/824 |
| 5,969,464 A | * | 10/1999 | Nakano et al. .............. 310/328 |
| 6,016,231 A | * | 1/2000 | Kanbara et al. ............. 359/824 |
| 6,051,909 A | * | 4/2000 | Shinke et al. ........... 310/316.01 |
| 6,084,363 A | * | 7/2000 | Mizumoto ................... 318/116 |
| 6,111,336 A | * | 8/2000 | Yoshida et al. .............. 310/328 |
| 6,134,057 A | * | 10/2000 | Ueyama et al. .............. 359/821 |
| 6,246,151 B1 | * | 6/2001 | Nakano .................. 310/316.02 |
| 6,483,226 B1 | | 11/2002 | Okada ......................... 310/328 |
| 6,570,294 B1 | * | 5/2003 | Iino et al. .............. 310/316.01 |
| 6,803,699 B1 | * | 10/2004 | Yuasa et al. ................. 310/317 |

FOREIGN PATENT DOCUMENTS

| JP | 2000-350482 A | 12/2000 |
| JP | 2001-211669 A | 8/2001 |

* cited by examiner

*Primary Examiner*—Darren Schuberg
*Assistant Examiner*—Derek Rosenau
(74) *Attorney, Agent, or Firm*—Sidley Austin LLP (57) ABSTRACT

The driving device has a piezoelectric element 32, a supporting member 16 fixed to one end of the piezoelectric element 32, a driving shaft 18 fixed to the other end of the piezoelectric element 32, a movable member 20 that is movably held on the driving member 18, and a driving circuit 33 that applies the drive voltage to the piezoelectric element 32. The driving circuit 33 includes a self-oscillating circuit 34, 38 that oscillates at a series resonance frequency of the piezoelectric element 32 and a non-linear circuit 36, 40, 42, 44, 46 for adding distortion to the drive voltage that is applied to the piezoelectric element 32.

7 Claims, 9 Drawing Sheets

Fig. 10

DRIVING DEVICE

RELATED APPLICATION

This application is based on Japanese Patent Application No. 2004-269475, the content of which is incorporated herein by reference.

BACKGROUND OF THE INVENTION

The present invention relates to a driving device using piezoelectric elements, for example., and particularly relates to a driving device suitable for driving an XY stage, photographic lenses of a camera, projection lenses of an overhead projector, lenses of binoculars, and the like.

Figure 7:
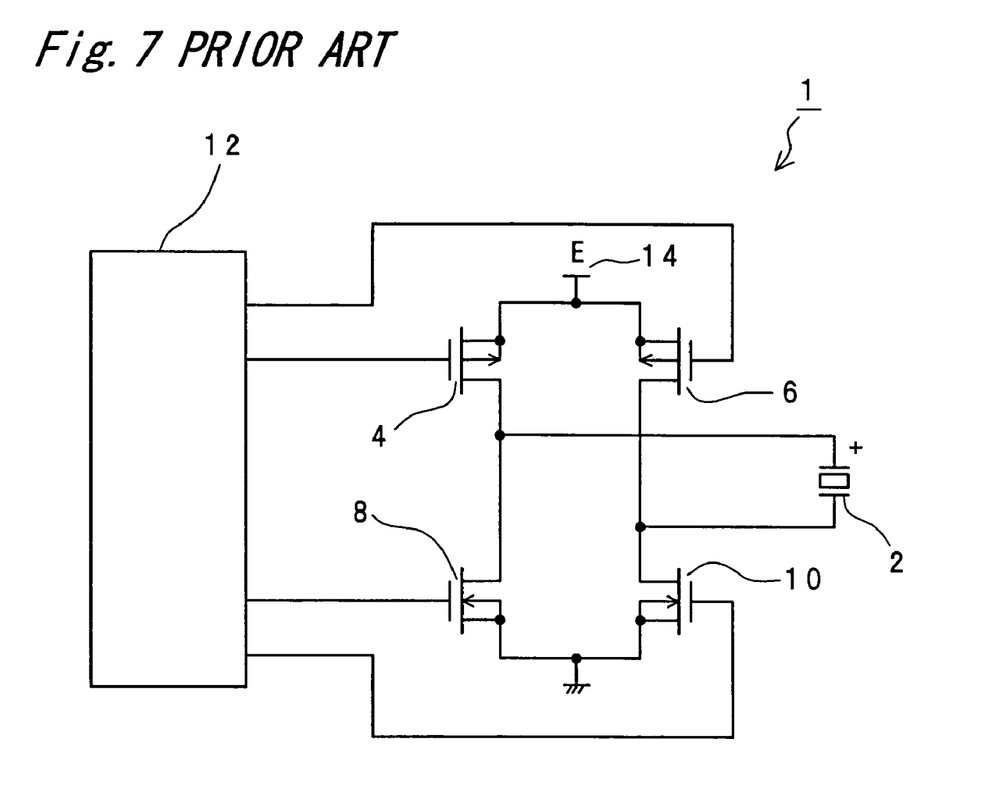
FIG. 7 is a diagram of a driving circuit of a conventional example of a piezoelectric actuator.

Conventionally, e.g., in Japanese Patent Laid-Open Publication No. 2000-350482, a piezoelectric actuator 1 as shown in FIG. 7 has been disclosed. In the piezoelectric actuator 1, a bridge circuit is composed of a piezoelectric element 2 and four FETs (field effect transistors) 4, 6, 8, and 10 connected in series, and signals are inputted from a control circuit 12 into bases of the FETs 4, 6, 8, and 10. A power supply 14 is connected between the FETs 4 and 6, and a ground is established between the FETs 8 and 10.

Among the four FETs 4, 6, 8, and 10, the FETs 4 and 6 are p-channel FETs, which are driven into cutoff state when signals inputted from the control circuit 12 into the bases are at high level and are driven into conducting state when the signals are at low level. By contrast, the FETs 8 and 10 among the four FETs 4, 6, 8, and 10 are n-channel FETs, which are driven into conducting state when the signals inputted from the control circuit 12 into the bases are at high level and are driven into cutoff state when the signals are at low level.

Figure 8:
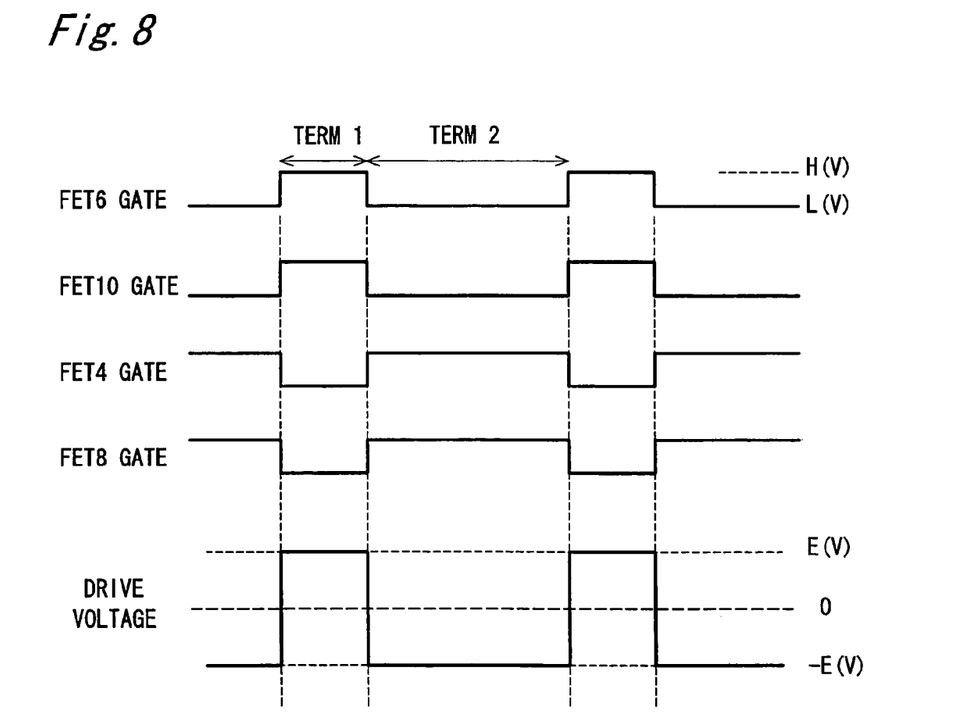
FIG. 8 is a timing chart representing an operation sequence of the piezoelectric actuator of FIG. 7.

FIG. 8 is a timing chart representing an operation sequence of the piezoelectric actuator 1 and shows gate voltage in the FETs 4, 6, 8, and 10 and drive voltage that is applied to the piezoelectric element 2. In a term 1 in FIG. 8, the p-channel FET 6 is in cutoff state with a high signal of H(V) inputted into the gate, the n-channel FET 10 is in conducting state with a high signal of H(V) inputted into the gate, the p-channel FET 4 is in conducting state with a low signal of L(V) inputted into the gate, and the n-channel FET 8 is in cutoff state with a low signal of L(V) inputted into the gate. In this situation, drive voltage of E is applied from the power supply 14 through the FETs 4 and 10 in conducting state to the piezoelectric element 2.

In a term 2 in FIG. 8, the p-channel FET 6 is in conducting state with a low signal of L(V) inputted into the gate, the n-channel FET 10 is in cutoff state with a low signal of L(V) inputted into the gate, the p-channel FET 4 is in cutoff state with a high signal of H(V) inputted into the gate, and the n-channel FET 8 is in conducting state with a high signal of H(V) inputted into the gate. In this situation, drive voltage of −E is applied from the power supply 14 through the FETs 6 and 8 in conducting state to the piezoelectric element 2.

By such alternation of the term 1 and the term 2 in FIG. 8, AC voltage having an amplitude of 2E(V) twice that of power-supply voltage of E(V) is applied to the piezoelectric element 2.

Figure 9:
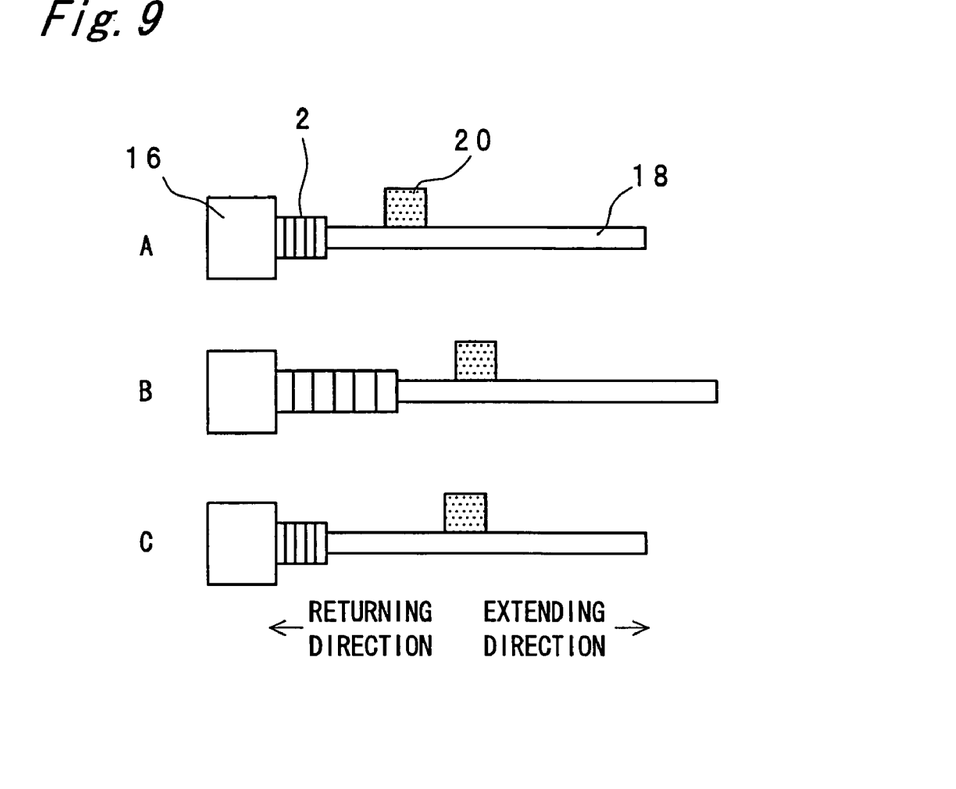
FIG. 9 is figure showing principle of operation of the piezoelectric actuator of FIG. 7.

FIG. 9 is figure showing principle of operation of the piezoelectric actuator 1. One end of the piezoelectric element 2 is fixed to a supporting member 16. To the other end of the piezoelectric element 2 is fixed a driving shaft (a driving member) 18 shaped like a round bar, for example. On the driving shaft 18 is movably held a movable member 20. The movable member 20 is engaged with the driving shaft 18 with a predetermined frictional force by virtue of a biasing force of an elastic member not shown such as plate spring and coiled spring. On the movable member 20 are mounted lenses or the like that are objects to be driven and that are not shown.

Figure 10:
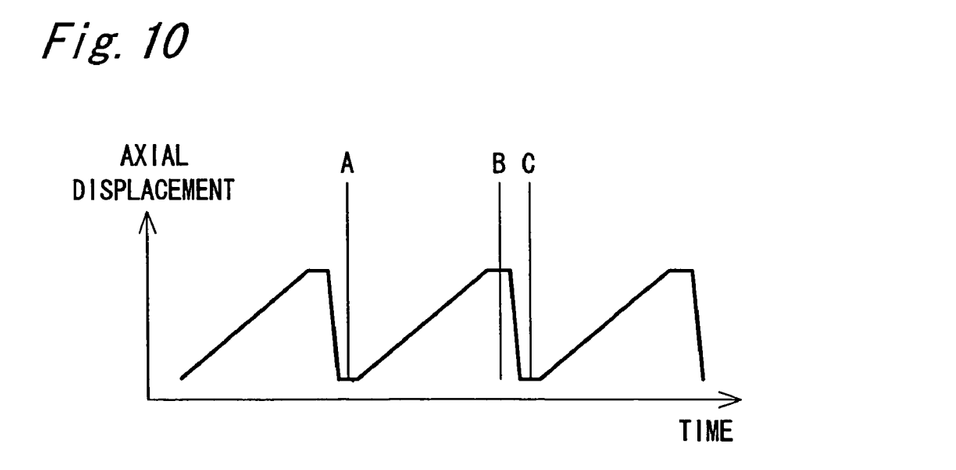
FIG. 10 is a diagram showing axial displacement of a driving shaft on condition that drive voltage shown in FIG. 8 and shaped like rectangular wave is applied to a piezoelectric element.

FIG. 10 shows axial displacement of the driving shaft 18 on condition that drive voltage shaped like rectangular wave as shown in FIG. 8 is applied to the piezoelectric element 2. The axial displacement has a sawtoothed shape with gentle slopes in rising parts and with steep slopes in falling parts. Situations A, B, and C in the drawing correspond to situations A, B, and C in FIG. 9, respectively. When the piezoelectric element 2 slowly elongates from the situation A as an initial situation, the driving shaft 18 and the movable member 20 engaged frictionally therewith are displaced together to a situation B at a comparatively slow velocity. When the piezoelectric element 2 contracts subsequently and rapidly, the displacement of the driving shaft 18 reverts at a comparatively high velocity. Therefore, a slip occurs between the movable member 20 and the driving shaft 18 and results in the situation C in which the movable member 20 has reverted only by a small amount. In the situation C, the movable member 20 has been displaced only by a small amount in an extending direction (a direction in which the movable member 20 goes away from the piezoelectric element 2) in comparison with the situation A that is the initial situation. Repetition of such elongation and contraction of the piezoelectric element 2 causes the movable member 20 to move in the extending direction.

Contrarily, the movable member 20 moves in a returning direction (a direction in which the movable member 20 nears the piezoelectric element 2) according to a principle opposite to the above. That is, displacement of the driving shaft 18 that results from repetition of rapid elongation and slow contraction of the piezoelectric element 2 has a sawtoothed shape with steep slopes in rising parts and with gentle slopes in falling parts, which shape is a reversal of that shown in FIG. 10. Thus a slip occurs between the movable member 20 and the driving shaft 18 when the piezoelectric element 2 rapidly elongates, and the movable member 20 is displaced only by a small amount in the returning direction when the piezoelectric element 2 slowly contracts. Repetition of such elongation and the contraction of the piezoelectric element 2 causes the movable member 20 to move in the returning direction.

Figure 11:
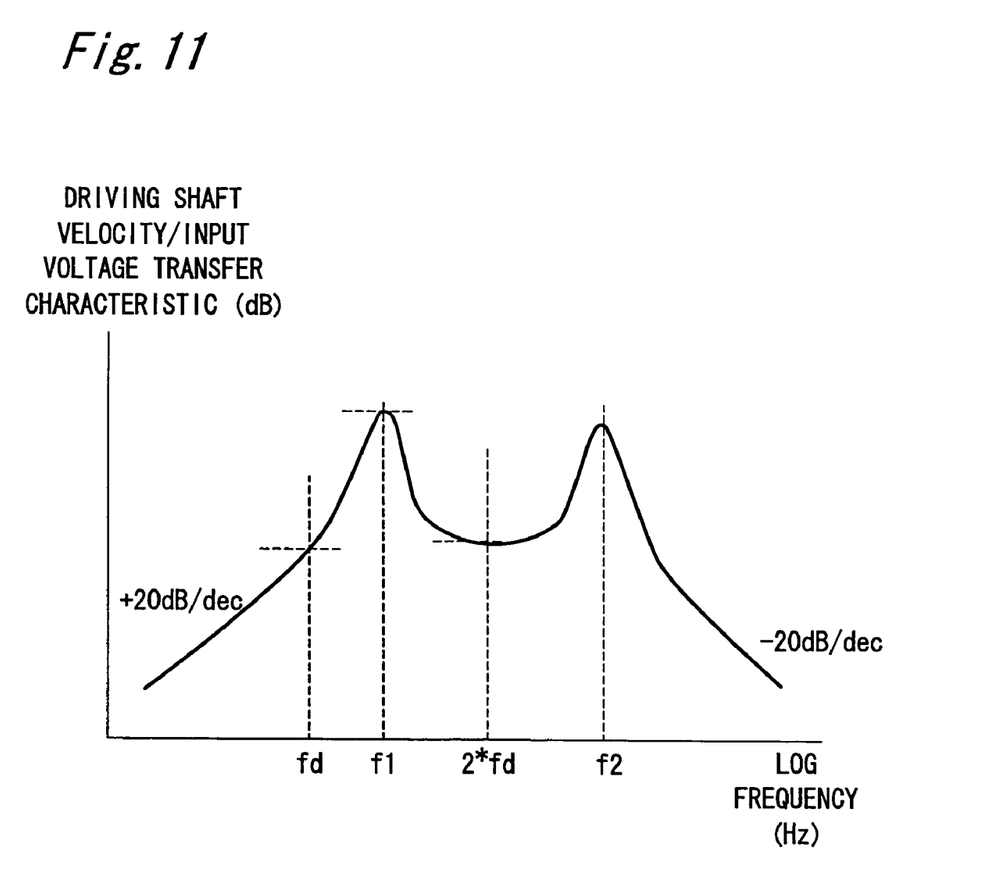
FIG. 11 is a diagram showing a frequency transfer characteristic of velocity of the driving shaft with respect to voltage inputted into the piezoelectric element in the piezoelectric actuator of FIG. 7.

FIG. 11 shows a frequency transfer characteristic of velocity of the driving shaft 18 with respect to voltage inputted into the piezoelectric element 2. The velocity of the driving shaft 18 has the characteristic in which the velocity increases in direct proportion to frequency of the voltage inputted into the piezoelectric element 2 on condition that the frequency is comparatively low, in which a primary resonance frequency f1 and a secondary resonance frequency f2 result in high velocities, and in which the velocity has a tendency to decrease on condition that the frequency is higher than the second resonance frequency. In order to obtain such sawtoothed displacement of the driving shaft 18 as shown in FIG. 10 from the drive voltage that is shaped like rectangular wave as shown in FIG. 8 and that is inputted into the piezoelectric element 2, as described in Japanese Patent Laid-Open Publication No. 2001-211669 in accordance with another patent application of the applicant of the present application, it is desirable to set a frequency f of the drive voltage 0.7 times the primary resonance frequency f1 and to set a duty ratio of the drive voltage at 0.3 for driving the movable member 20 in the extending direction (at 0.7 for driving the movable member 20 in the returning direction).

Though the prior art described above makes it possible to drive the piezoelectric actuator 1 with use of the simple driving circuit, the prior art has a problem of low velocity of the movable member 20. The velocity of the movable member 20 can be increased by adjustment of a relation between phases of primary drive frequency component fd and secondary drive frequency component 2*fd that are contained in the drive voltage, with increase in the frequency f of the drive voltage (in this case, the drive voltage is not shaped like rectangular wave).

With reference to FIG. 11, velocity amplitude can be increased with fd and 2*fd nearing f1 and f2, respectively. Provided that the drive voltage is shaped like sawtooth with fd equal to f1 and with 2*fd extremely near to f2, for example, displacement of the driving shaft 18 is also shaped like sawtooth and the velocity of the driving shaft 18 is made higher than usual, as shown in FIG. 11. Thus the velocity of the movable member 20 can be increased.

In this case, however, the resonance frequencies vary according to initial dispersion of the piezoelectric actuator, environmental temperature and the like, and it is therefore impossible to make fd equal to f1 at all times. Accordingly, it has been difficult to achieve stable increase in the velocity against dispersion resulting from mass production, environmental fluctuation, and the like.

SUMMARY OF THE INVENTION

In order to resolve the above problem, a driving device in accordance with a first aspect of the invention has an electromechanical transducer element;

a supporting member fixed to one end of the electromechanical transducer element;

a driving member fixed to the other end of the electromechanical transducer element;

a movable member that is movably held on the driving member; and a driving circuit for applying drive voltage to the electromechanical transducer element;

the driving circuit including a self-oscillating circuit that oscillates at a series resonance frequency of the electromechanical transducer element and a non-linear circuit for adding distortion to the drive voltage that is applied to the electromechanical transducer element.

In the driving device having this configuration, the self-oscillating circuit that oscillates at the series resonance frequency of the electromechanical transducer element is provided in the driving circuit, and thus a frequency of the drive voltage that is applied to the electromechanical transducer element coincides with the resonance frequency of the electromechanical transducer element at all times. Besides, the non-linear circuit for adding distortion to the drive voltage that is applied to the electromechanical transducer element is provided in the driving circuit, and thus the drive voltage that is applied to the electromechanical transducer element has a sawtoothed waveform. As a result, the electromechanical transducer element can be driven constantly by the sawtoothed drive voltage having the resonance frequency, and stable and high-velocity drive of the movable member can be achieved, in spite of initial dispersion of the driving device, fluctuation in environmental temperature, and the like.

A driving device in accordance with a second aspect of the invention has an electromechanical transducer element;

a supporting member fixed to one end of the electromechanical transducer element;

a driving member fixed to the other end of the electromechanical transducer element;

a movable member that is movably held on the driving member; and a driving circuit for applying drive voltage to the electromechanical transducer element;

the driving circuit including:

a current-detecting circuit for detecting as voltage a current flowing through the electromechanical transducer element;

an amplifier circuit for amplifying the voltage detected by the current-detecting circuit;

an outflow-current-limiting circuit for limiting a current that flows out from the amplifier circuit;

an inflow-current-limiting circuit for limiting a current that flows into the amplifier circuit; and a switching circuit for switching between the outflow-current-limiting circuit and the inflow-current-limiting circuit.

In the driving device having this configuration, the current-detecting circuit for detecting as voltage a current flowing through the electromechanical transducer element and the amplifier circuit for amplifying the voltage detected by the current-detecting circuit are provided in the driving circuit, and thus a frequency of the drive voltage that is applied to the electromechanical transducer element coincides with a resonance frequency of the electromechanical transducer element at all times. Besides, the outflow-current-limiting circuit for limiting a current that flows out from the amplifier circuit and the inflow-current-limiting circuit for limiting a current that flows into the amplifier circuit are provided in the driving circuit, and thus the drive voltage that is applied to the electromechanical transducer element is distorted so as to have a sawtoothed waveform. As a result, the electromechanical transducer element can be driven constantly by the sawtoothed drive voltage having the resonance frequency, and stable and high-velocity drive of the movable member can be achieved, in spite of initial dispersion of the driving device, fluctuation in environmental temperature, and the like.

In the driving device of the invention, the self-oscillating circuit or the amplifier circuit may have a function of automatic gain control. In the device, the automatic gain control may be performed so that the drive voltage applied to the electromechanical transducer element has a uniform amplitude. Stable self-oscillation can be caused by such automatic gain control as makes the amplitude of the drive voltage uniform.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
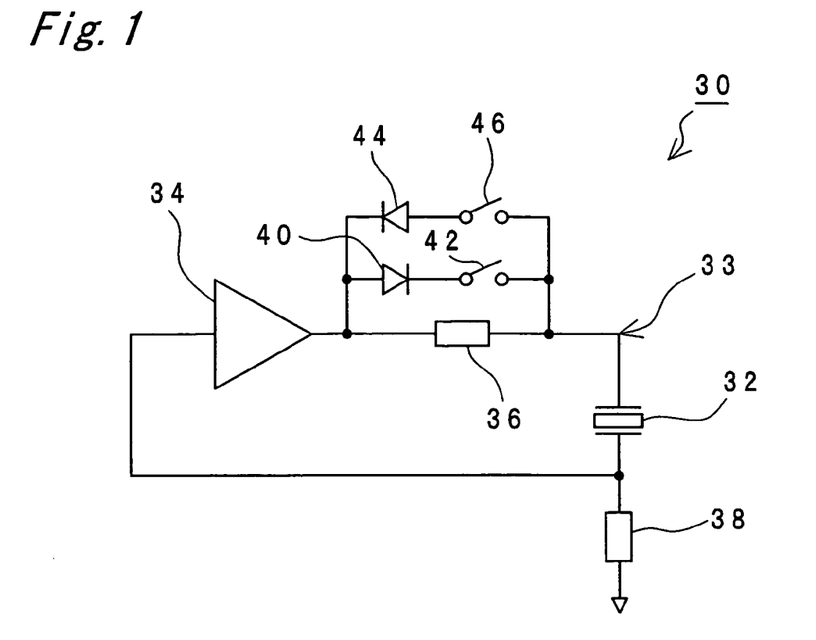
FIG. 1 is a circuit diagram in principle of a piezoelectric actuator.

FIG. 1 is a circuit diagram in principle of a piezoelectric actuator 30 that is one embodiment of a driving device of the invention. The piezoelectric actuator 30 has a piezoelectric element 32 as an electromechanical transducer element. Driving part including the piezoelectric element 32 has a configuration similar to that of the prior art described with reference to FIG. 9. That is, one end of the piezoelectric element 32 is fixed to a supporting member 16. To the other end of the piezoelectric element 32 is fixed a driving shaft (a driving member) 18 shaped like a round bar, for example. On the driving shaft 18 is movably held a movable member 20. The movable member 20 is engaged with the driving shaft 18 with a predetermined frictional force by virtue of a biasing force of an elastic member not shown such as plate spring and coiled spring. On the movable member 20 are mounted lenses or the like that are objects to be driven and that are not shown.

Across the piezoelectric element 32 is connected a driving circuit 33, as shown in FIG. 1. In the driving circuit 33, an amplifier (an amplifier circuit) 34 and a current-limiting resistor 36 connected to an output terminal of the amplifier 34 are connected in series. Between the piezoelectric element 32 and an input terminal of the amplifier 34 is connected one end of a current-detecting resistor (a current-detecting circuit) 38 of which the other end is grounded. Between the amplifier 34 and the piezoelectric element 32, a first diode 40 and a first switch (switching circuit) 42 connected to a cathode terminal thereof and a second diode 44 and a second switch (switching circuit) 46 connected to an anode terminal thereof are connected in parallel with each other and in parallel with the current-limiting resistor 36.

In this configuration, a self-oscillating circuit that oscillates at a series resonance frequency of the piezoelectric element 32 is composed of the amplifier 34 and the current-detecting resistor 38, and a non-linear circuit for adding distortion to drive voltage that is applied to the piezoelectric element 32 is composed of the current-limiting resistor 36, the diodes 40 and 44, and the switches 42 and 46. An inflow-current-limiting circuit for limiting a current that flows into the amplifier 34 is composed of the current-limiting resistor 36, the first diode 40, and the first switch 42, and an outflow-current-limiting circuit for limiting a current that flows out from the amplifier 34 is composed of the current-limiting resistor 36, the second diode 44, and the second switch 46.

Figure 2:
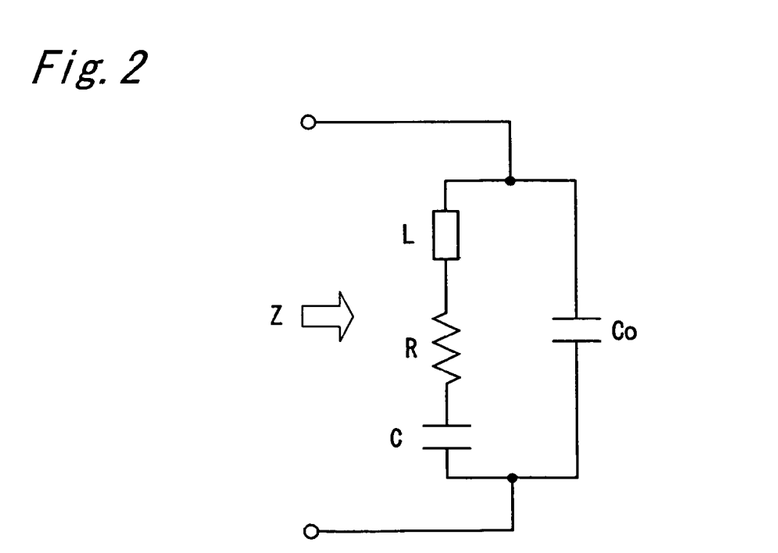
FIG. 2 is a diagram of an equivalent circuit of a component composed of a piezoelectric element, a supporting member, and a driving shaft, as seen looking from an electrical input port of the piezoelectric element.

FIG. 2 is a diagram of an equivalent circuit of a component composed of the piezoelectric element 32, the supporting member 16, and the driving shaft 18, as seen looking from an electrical input port of the piezoelectric element 32. An impedance Z of the equivalent circuit can be represented by an expression below. In the expression and FIG. 2, "Co" denotes a damping capacitance.

$$Z = \frac{1}{sCo} \cdot \frac{s^2 + \frac{r}{L}s + \frac{1}{CL}}{s^2 + \frac{r}{L}s + \frac{C+Co}{CoCL}} \quad \text{[Expression 1]}$$

(wherein s is Laplacian operator (s=j2πf), wherein f is frequency)

Figure 3:
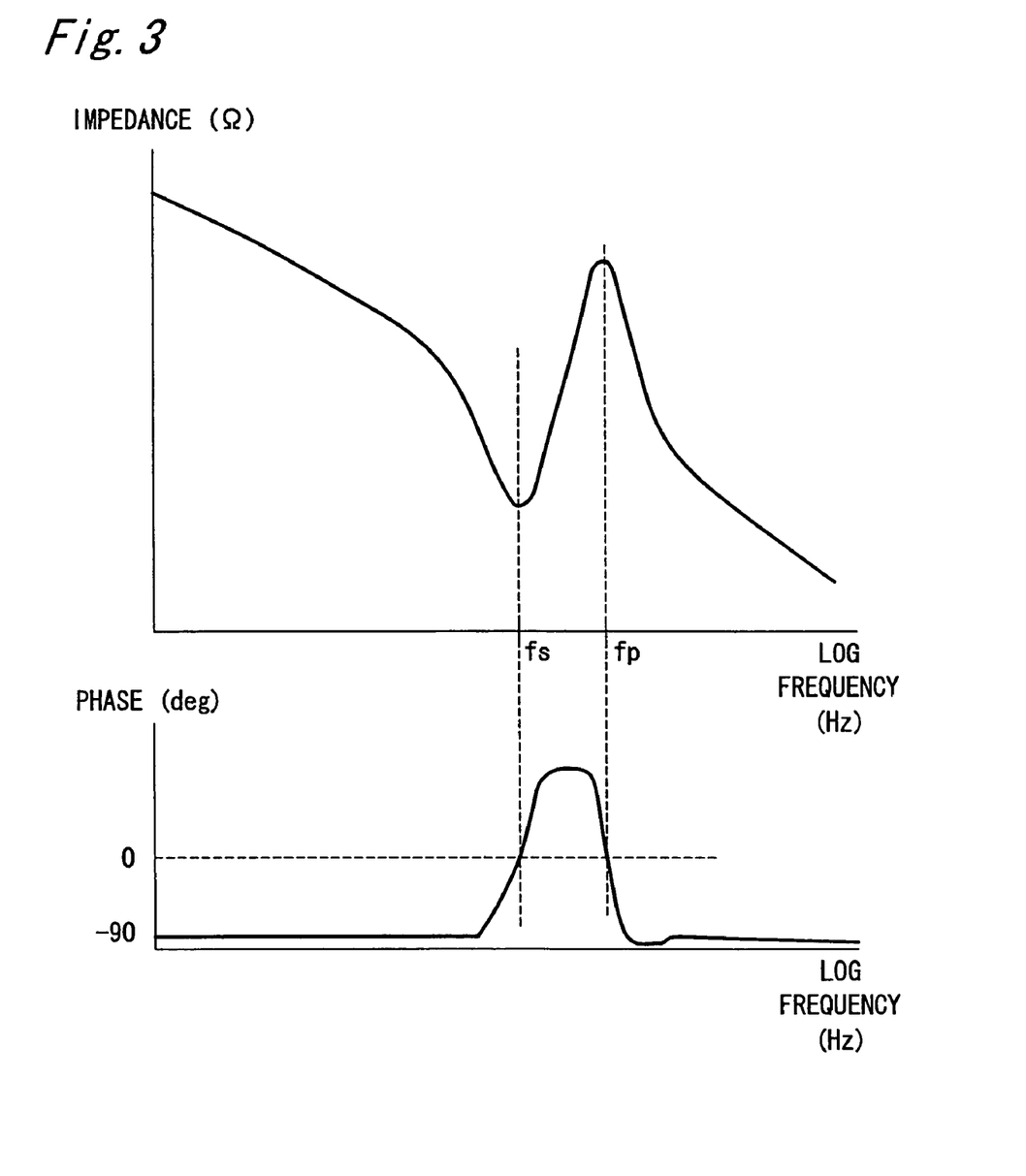
FIG. 3 is a diagram showing characteristics of absolute value and phase of impedance of the equivalent circuit of FIG. 2 in which frequency is used as a parameter.

FIG. 3 shows characteristics of absolute value and phase of the impedance Z in which the frequency f of the expression is used as a parameter. In FIG. 3, "fp" denotes an antiresonant frequency. At a series resonance frequency fs of the LRC circuit shown in FIG. 2, the absolute value of the impedance Z is minimized and the phase thereof becomes 0 deg. The series resonance frequency fs coincides, at all times, with a mechanical resonance frequency f1 described above of the piezoelectric element 32, and therefore the drive of the piezoelectric element 32 with the drive voltage having the series resonance frequency fs fulfils stable and high-velocity drive of the movable member 20.

Referring to FIG. 1 again, the driving circuit 33 has a configuration of a feedback circuit in which a current flowing through the piezoelectric element 32 is detected by the current-detecting resistor 38, in which the detected voltage is amplified by the amplifier 34, and in which the amplified voltage is applied to the piezoelectric element 32 through the current-limiting resistor 36. When the phase of the impedance of the piezoelectric element 32 becomes 0 deg and when the amplifier 34 has an appropriate gain (a loop transfer characteristic gain is one time), the feedback circuit is brought into a state of positive feedback and oscillates. A frequency of the oscillation is a frequency at which the phase of the impedance of the piezoelectric element 32 is 0 deg, that is, the series resonance frequency fs. The drive voltage for the piezoelectric element 32 in this state has a shape like sine wave. Such a technique for bringing about self-oscillation in accordance with an impedance characteristic of a device is also used for oscillation circuits using crystal oscillator, ceramic oscillator or the like.

On condition that the drive voltage is like sine wave even though having the series resonance frequency fs as described above, a velocity of elongation of the piezoelectric element 32 coincides with a velocity of contraction thereof and therefore the movable member 20 cannot be moved. In the piezoelectric actuator 30 of the embodiment, for this reason, distortion is added to the drive voltage having the series resonance frequency fs by the current-limiting resistor 36, the diodes 40 and 44, and the switches 42 and 46.

Figure 4A:
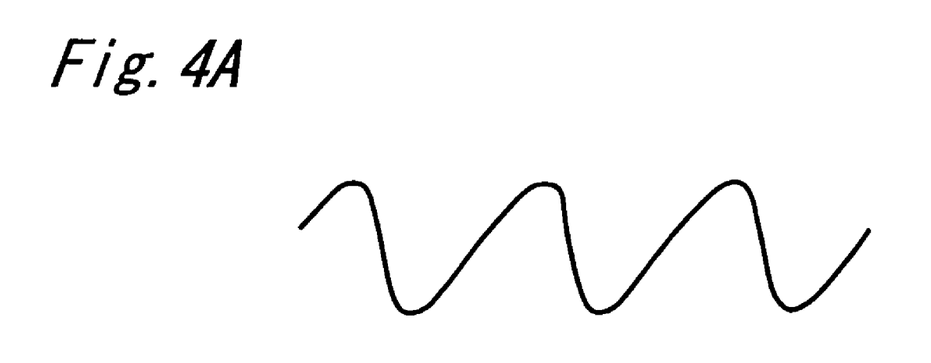
FIGS. 4A and 4B are diagrams showing waveforms of drive voltage for the piezoelectric element.

When the first switch 42 is in conducting state and when the second switch 46 is opened, the current that flows into the amplifier 34 is limited by the current-limiting resistor 36 but the current that flows out from the amplifier 34 passes through the first diode 40 and the first switch 42 and thus undergoes no limitation. With this operation, the drive voltage applied to the piezoelectric element 32 has a waveform in which distortion is added to sine wave and which is generally shaped like sawtooth as shown in FIG. 4A. That is, the waveform has gentle slopes in rising parts and steep slopes in falling parts. Application of the drive voltage having such waveform to the piezoelectric element 32 causes the piezoelectric element 32 to oscillate with repetition of slow elongation and rapid contraction. As a result, the driving shaft 18 exhibits such sawtoothed displacement as shown in FIG. 10 and thus the movable member 20 moves in an extending direction.

Figure 4B:
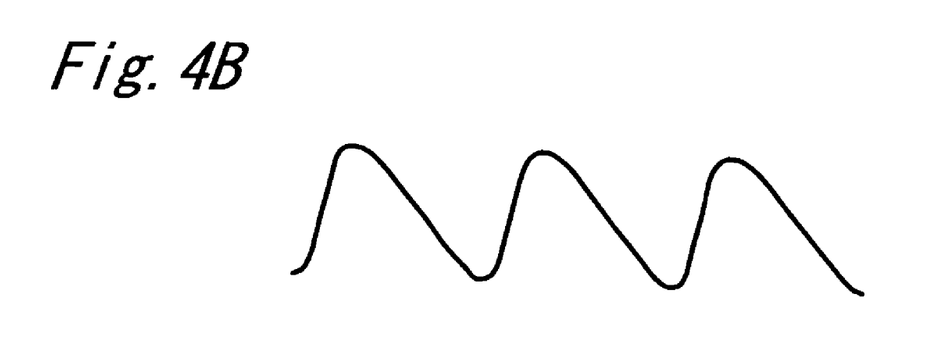

When the first switch 42 is opened and when the second switch 46 is brought into conducting state, the current that flows out from the amplifier 34 cannot flow into the second diode 44 but flows into the current-limiting resistor 36 and thus undergoes limitation. With this operation, the drive voltage applied to the piezoelectric element 32 has a waveform in which distortion is added to sine wave and which is generally shaped like sawtooth as shown in FIG. 4B. That is, the waveform has steep slopes in rising parts and gentle slopes in falling parts. Application of the drive voltage having such waveform to the piezoelectric element 32 causes the piezoelectric element 32 to oscillate with repetition of rapid elongation and slow contraction. As a result, the driving shaft 18 exhibits sawtoothed displacement symmetrical to that shown in FIG. 10 and thus the movable member 20 moves in a returning direction.

Figure 5:
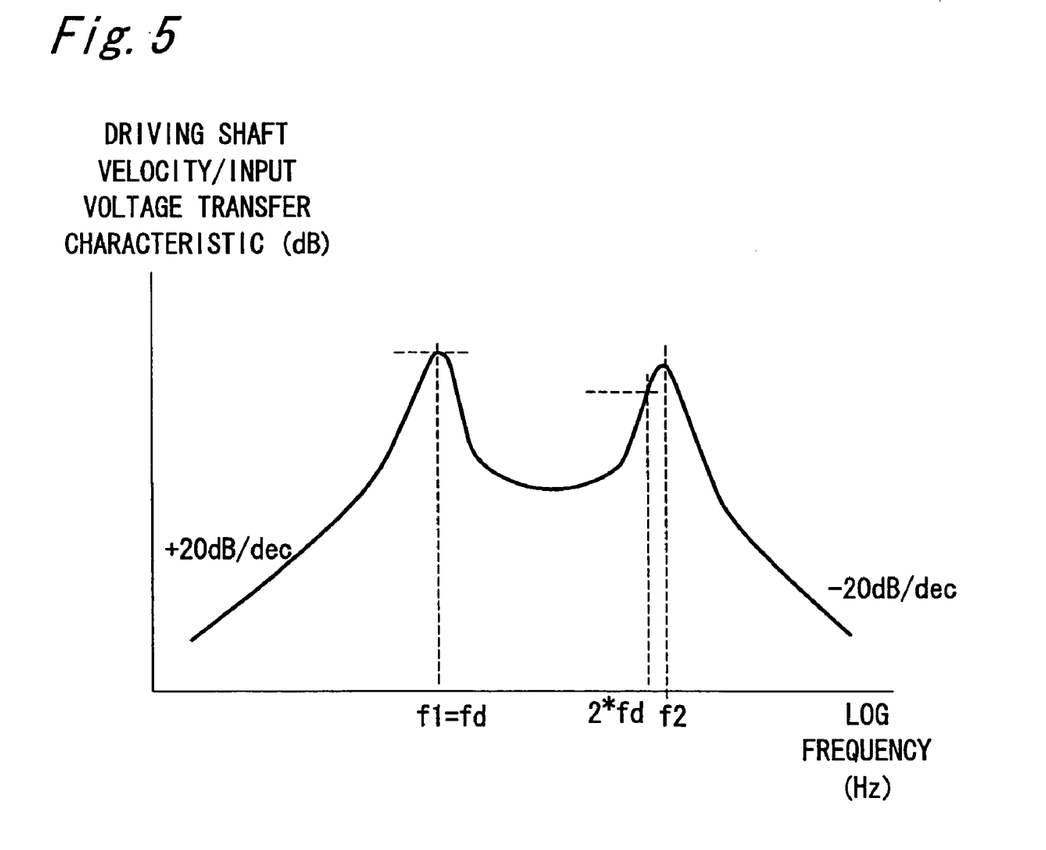
FIG. 5 is a diagram showing a frequency transfer characteristic of velocity of the driving shaft with respect to voltage inputted into the piezoelectric element in an embodiment.

FIG. 5 shows a frequency transfer characteristic of velocity of the driving shaft 18 with respect to voltage inputted into the piezoelectric element 32 in the embodiment. In contrast to FIG. 11, a drive frequency fd is equal to f1 and 2*fd is near to f2, and therefore velocity amplitude of the driving shaft 18 and moving velocity of the movable member 20 are heightened at both the frequencies. Even if the resonance frequency f1 varies according to initial dispersion of the piezoelectric actuator 30, environmental temperature or the like in this arrangement, feedback is provided so that the drive frequency fd may coincide with the series resonance frequency fs (=fd) of the impedance Z of the piezoelectric element 32. Accordingly, stable and high-velocity drive can be achieved at all times.

Figure 6:
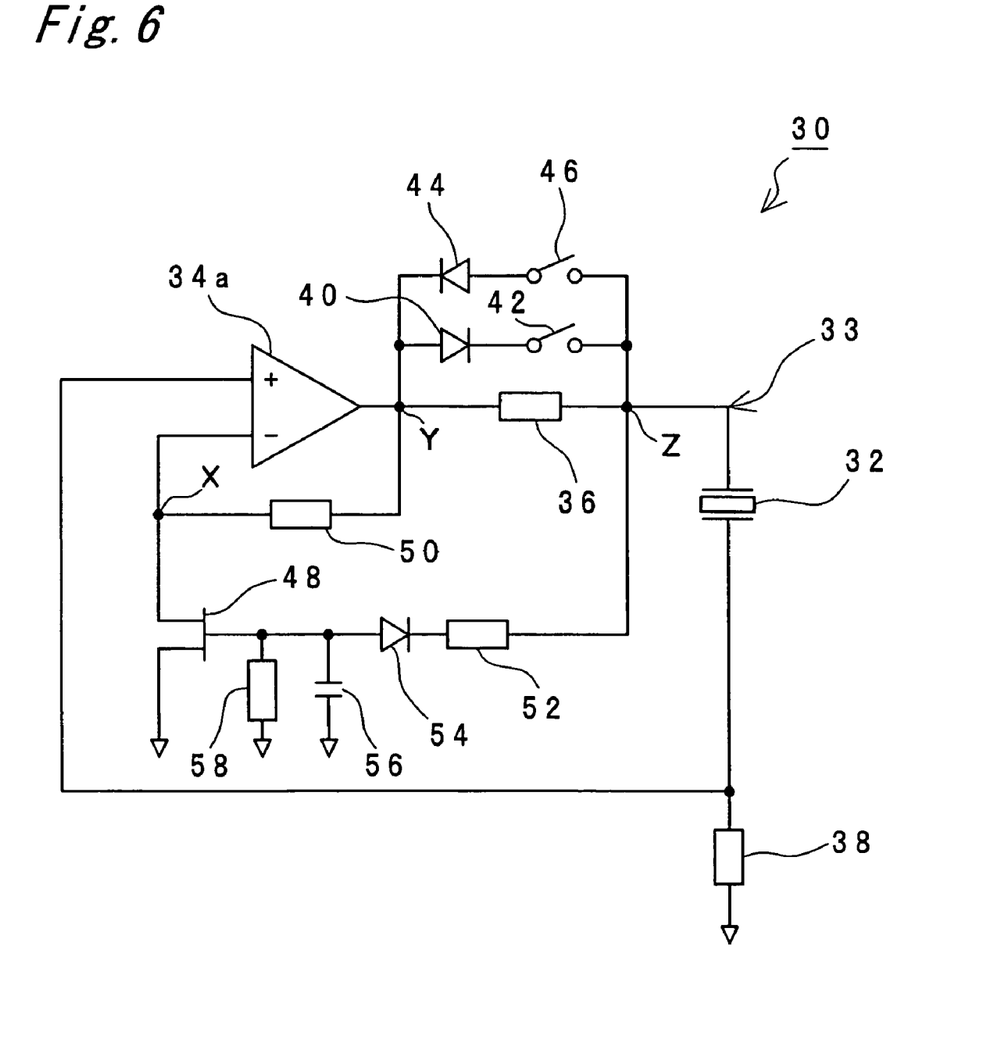
FIG. 6 is a diagram showing a specific example of a driving circuit of the piezoelectric actuator.

FIG. 6 shows a specific example of the driving circuit 33 of the piezoelectric actuator 30. In FIG. 6, the same members as those in FIG. 1 are designated by the same reference numerals. As different from FIG. 1, an amplifier 34a is an operational amplifier, and a negative input terminal of the operational amplifier 34a is connected to a source of an FET 48. A drain of the FET 48 is grounded. A feedback resistor 50 is connected between a node X between the operational amplifier 34a and the FET 48 and a node Y between the operational amplifier 34a and a current-limiting resistor 36. A node Z between the current-limiting resistor 36 and a piezoelectric element 32 is connected through a resistor 52 and a diode 54 to a base of the FET 48. Between the diode 54 and the FET 48 are connected each one end of a capacitor 56 and a resistor 58 of which the other ends are grounded. An automatic gain control circuit is composed of the operational amplifier 34a, the FET 48, the feedback resistor 50, and the like.

In the driving circuit 33 of FIG. 6, drive voltage applied to the piezoelectric element 32 is subjected to half-wave rectification, resultant signal is applied to a gate of the FET 48, and a value Rfet of resistance between the drain and the source of the FET 48 is thereby changed. An amplification degree A of a noninverting amplifier circuit composed of the operational amplifier 34a, the feedback resistor 50 (having a value of resistance of Rf), and the FET 48 is represented by a following expression.

$$A=1+Rf/Rfet \qquad \text{[Expression 2]}$$

As is apparent from the expression, small drive voltage of the piezoelectric element 32 results in small resistance Rfet between the drain and the source of the FET 48 and high amplification degree A and strengthens the oscillation. In reverse, large drive voltage of the piezoelectric element 32 results in large resistance Rfet between the drain and the source of the FET 48 and low amplification degree A and weakens the oscillation. By such automatic control of a gain of the operational amplifier 34a on basis of the drive voltage of the piezoelectric element 32, a uniform amplitude of the drive voltage of the piezoelectric element 32 is maintained at all times and stable self-oscillation can be attained.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A driving device comprising:
   an electromechanical transducer element;
   a driving member fixed to an end of the electromechanical transducer element;
   a movable member that is movably held on the driving member; and
   a driving circuit for applying drive voltage to the electromechanical transducer element;
   the driving circuit including a self-oscillating circuit that oscillates at a series resonance frequency of the electromechanical transducer element and a non-linear circuit for adding distortion to the drive voltage so as to make the drive voltage have a generally sawtooth-shaped waveform, wherein
   a frequency of the drive voltage is equal to a primary resonance frequency and a frequency two times the frequency of the drive voltage is near to a secondary resonance frequency in a frequency transfer characteristic of velocity of the driving member with respect to voltage inputted into the electromechanical transducer element, and the non-linear circuit is composed of a current-limiting resistor, a first diode and a first switch connected to a cathode terminal thereof, and a second diode and a second switch connected to an anode terminal thereof, which are connected in parallel with each other.

2. A driving device as claimed in claim 1, wherein the self-oscillating circuit has a function of automatic gain control.

3. A driving device as claimed in claim 2, wherein the automatic gain control is performed so that the drive voltage applied to the electromechanical transducer element has a uniform amplitude.

4. A driving device comprising:
   an electromechanical transducer element;
   a driving member fixed to an end of the electromechanical transducer element
   a movable member that is movably held on the driving member; and
   a driving circuit for applying drive voltage to the electromechanical transducer element;

the driving circuit including:
- a current-detecting circuit for detecting as voltage a current flowing through the electromechanical transducer element;
- an amplifier circuit for amplifying the voltage detected by the current-detecting circuit;
- an outflow-current-limiting circuit for limiting a current that flows out from the amplifier circuit;
- an inflow-current-limiting circuit for limiting a current that flows into the amplifier circuit; and
- a switching circuit for switching between the outflow-current-limiting circuit and the inflow-current-limiting circuit, wherein the outflow-current-limiting circuit, the inflow-current-limiting circuit and the switching circuit are composed of a current-limiting resistor connected in series between the amplifier circuit and the electromechanical transducer element, a first diode and a first switch connected to a cathode terminal thereof, and a second diode and a second switch connected to an anode terminal thereof, which are connected in parallel with each other and in parallel with the current-limiting resistor.

5. A driving device as claimed in claim 4, wherein the amplifier circuit has a function of automatic gain control.

6. A driving device as claimed in claim 5, wherein the automatic gain control is performed so that the drive voltage applied to the electromechanical transducer element has a uniform amplitude.

7. A driving device as claimed in claim 4, wherein a frequency of the drive voltage is equal to a primary resonance frequency and a frequency two times the frequency of the drive voltage is near to a secondary resonance frequency in a frequency transfer characteristic of velocity of the driving member with respect to voltage inputted into the electromechanical transducer member.

* * * * *